(12) United States Patent
Zhao et al.

(10) Patent No.: US 12,284,346 B2
(45) Date of Patent: Apr. 22, 2025

(54) SYSTEMS AND METHODS FOR PARTITION DEPENDENT SECONDARY TRANSFORM

(71) Applicant: Tencent America LLC, Palo Alto, CA (US)

(72) Inventors: Xin Zhao, Palo Alto, CA (US); Madhu Peringassery Krishnan, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 231 days.

(21) Appl. No.: 18/117,218

(22) Filed: Mar. 3, 2023

(65) Prior Publication Data

US 2023/0291900 A1    Sep. 14, 2023

Related U.S. Application Data

(60) Provisional application No. 63/318,262, filed on Mar. 9, 2022.

(51) Int. Cl.
*H04N 19/12*    (2014.01)
*H04N 19/13*    (2014.01)
*H04N 19/159*   (2014.01)
*H04N 19/176*   (2014.01)
*H04N 19/61*    (2014.01)

(52) U.S. Cl.
CPC ............ *H04N 19/12* (2014.11); *H04N 19/13* (2014.11); *H04N 19/159* (2014.11); *H04N 19/176* (2014.11); *H04N 19/61* (2014.11)

(58) Field of Classification Search
CPC ...... H04N 19/12; H04N 19/122; H04N 19/13; H04N 19/157; H04N 19/159; H04N 19/176; H04N 19/61; H04N 19/625; H04N 19/70
See application file for complete search history.

(56) References Cited

U.S. PATENT DOCUMENTS

2018/0103252 A1    4/2018  Hsieh et al.
2018/0302631 A1   10/2018  Chiang et al.
(Continued)

OTHER PUBLICATIONS

Benjamin Bross et al., "General Video Coding Technology in Responses to the Joint Call for Proposals on Video Compression with Capability Beyond HEVC", IEEE Transactions on Circuits and Systems for Video Technology, vol. 30, No. 5, May 2020, 15 pgs., Retrieved from the Internet: https://ieeexplore.ieee.org/stamp/stamp.jsp?tp=&arnumber=8883186.

(Continued)

*Primary Examiner* — Dakshesh D Parikh
(74) *Attorney, Agent, or Firm* — Morgan, Lewis & Bockius LLP

(57) ABSTRACT

The various implementations described herein include methods and systems for coding video. In one aspect, a method includes determining whether multiple transform units are within the video block in accordance with a determination that the inter-prediction mode is enabled; and in accordance with a determination that multiple transform units are within the video block: determining a transform unit of the multiple transform units to apply a secondary transform based on a relative location of the transform unit within the video block, applying the secondary transform to the transform unit, and reconstructing/processing the video block based at least on the secondary transform.

20 Claims, 14 Drawing Sheets

(56) References Cited

U.S. PATENT DOCUMENTS

| | | |
|---|---|---|
| 2019/0281321 A1 | 9/2019 | Zhao et al. |
| 2020/0389671 A1 | 12/2020 | Zhao et al. |
| 2021/0014493 A1* | 1/2021 | Koo .................... H04N 19/157 |
| 2021/0266581 A1 | 8/2021 | Jung et al. |

OTHER PUBLICATIONS

Tencent Technology, ISRWO, PCT/US2023/014718, Sep. 6, 2023, 15 pgs.

Jicheng An, et al., "Non-CE7: Boundary-Dependent Transform for Inter-Predicted Residue", Document: JCTVC-G281, Joint Collaborative Team on Video Coding (JCT-VC) of ITU-T SG16 WP3 and ISO/IEC JTC1/SC29/WG11, 7th Meeting: Geneva, CH., Nov. 21, 2011, 10 pgs.

\* cited by examiner

| Transform Type | Basis function $T_i(j)$, $i,j=0, 1,\ldots, N-1$ |
|---|---|
| DCT-2 | $T_i(j) = \omega_0 \cdot \sqrt{\dfrac{2}{N}} \cdot \cos\left(\dfrac{\pi \cdot i \cdot (2j+1)}{2N}\right)$<br>where $\omega_0 = \begin{cases} \sqrt{\dfrac{2}{N}} & i = 0 \\ 1 & i \neq 0 \end{cases}$ |
| DST-4 | $T_i(j) = \sqrt{\dfrac{2}{N}} \cdot \sin\left(\dfrac{\pi \cdot (2i+1) \cdot (2j+1)}{4N}\right)$ |
| DST-7 | $T_i(j) = \sqrt{\dfrac{4}{2N+1}} \cdot \sin\left(\dfrac{\pi \cdot (2i+1) \cdot (j+1)}{2N+1}\right)$ |

FIG. 4

| Transform Types | Description | Prediction mode | |
|---|---|---|---|
| | | Intra | Inter |
| DCT_DCT | DCT ↓ and → | ✓ (all block sizes) | ✓ (all block sizes) |
| ADST_DCT | ADST ↓; DCT → | ✓ (block size ≤ 16×16) | ✓ (block size ≤ 16×16) |
| DCT_ADST | DCT ↓; ADST → | | |
| ADST_ADST | ADST ↓ and → | | |
| FLIPADST_DCT | FLIPADST ↓; DCT → | ✗ | ✓ (block size ≤ 16×16) |
| DCT_FLIPADST | DCT ↓; FLIPADST → | | |
| FLIPADST_FLIPADST | FLIPADST ↓ and → | | |
| ADST_FLIPADST | ADST ↓; FLIPADST → | | |
| FLIPADST_ADST | FLIPADST ↓; ADST → | | |
| IDTX | IDTX ↓ and → | ✓ (block size ≤ 16×16) | ✓ (block size ≤ 32×32) |
| V_DCT | DCT ↓; IDTX → | ✓ (block size < 16×16) | ✓ (block size ≤ 16×16) |
| H_DCT | IDTX ↓; DCT → | | |
| V_ADST | ADST ↓; IDTX → | ✗ | ✓ (block size < 16×16) |
| H_ADST | IDTX ↓; ADST → | | |
| V_FLIPADST | FLIPADST ↓; IDTX → | ✗ | ✓ (block size < 16×16) |
| H_FLIPADST | IDTX ↓; FLIPADST → | | |

FIG. 5A

| Intra prediction | Vertical Transform | Horizontal Transform |
|---|---|---|
| DC_PRED | DCT | DCT |
| V_PRED | ADST | DCT |
| H_PRED | DCT | ADST |
| D45_PRED | DCT | DCT |
| D135_PRED | ADST | ADST |
| D113_PRED | ADST | DCT |
| D157_PRED | DCT | ADST |
| D203_PRED | DCT | ADST |
| D67_PRED | ADST | DCT |
| SMOOTH_PRED | ADST | ADST |
| SMOOTH_V_PRED | ADST | DCT |
| SMOOTH_H_PRED | DCT | ADST |
| PAETH_PRED | ADST | ADST |

FIG. 5B

| intra nominal mode | primary transform type | IST set index |
|---|---|---|
| DC_PRED | DCT only | 0 |
| V_PRED | | 1 |
| H_PRED | | 1 |
| D45_PRED | | 2 |
| D135_PRED | | 3 |
| D113_PRED | | 4 |
| D157_PRED | | 4 |
| D203_PRED | | 5 |
| D67_PRED | | 5 |
| SMOOTH | | 6 |
| SMOOTH_V | | 1 |
| SMOOT_H | | 1 |
| DC_PRED | ADST only | 7 |
| V_PRED | | 8 |
| H_PRED | | 8 |
| D45_PRED | | 9 |
| D135_PRED | | 10 |
| D113_PRED | | 11 |
| D157_PRED | | 11 |
| D203_PRED | | 12 |
| D67_PRED | | 12 |
| SMOOTH | | 13 |
| SMOOTH_V | | 8 |
| SMOOT_H | | 8 |

FIG. 7

| TU Boundary | | Horizontal Trans. | TU Boundary | | Vertical Trans. |
|---|---|---|---|---|---|
| Left | Right | | Top | Bottom | |
| non-PU | PU | DST-VII | non-PU | PU | DST-VII |
| PU | non-PU | F(DST-VII) | PU | non-PU | F(DST-VII) |
| PU | PU | DCT-II | PU | PU | DCT-II |
| non-PU | non-PU | DCT-II | non-PU | non-PU | DCT-II |

FIG. 10

| TU Boundary | | Horizontal Trans. | TU Boundary | | Vertical Trans. |
|---|---|---|---|---|---|
| Left | Right | | Top | Bottom | |
| non-PU | PU | F(DCT-IV) | non-PU | PU | F(DCT-IV) |
| PU | non-PU | DCT-IV | PU | non-PU | DCT-IV |
| PU | PU | DCT-II | PU | PU | DCT-II |
| non-PU | non-PU | DCT-II | non-PU | non-PU | DCT-II |

FIG. 11

| TU | Horizontal Trans. | Vertical Trans. |
|---|---|---|
| $TU_0$ | F(DST-VII) | F(DST-VII) |
| $TU_1$ | DST-VII | F(DST-VII) |
| $TU_2$ | F(DST-VII) | DST-VII |
| $TU_3$ | DST-VII | DST-VII |

FIG. 12

1400 receiving, from the video stream, a first control flag, wherein the first control flag indicates whether inter-prediction mode is enabled for a video block of the video stream 1410

↓ in accordance with a determination that the inter-prediction mode is enabled, determining whether multiple transform units are within the video block 1420

↓ in accordance with a determination that multiple transform units are within the video block:

> determining a first transform unit of the multiple transform units to apply a first secondary transform based on a first relative location of the first transform unit within the video block;
>
> applying the first secondary transform to the first transform unit; and
>
> reconstructing the video block based at least on the first secondary transform 1430

FIG. 14

1500 receiving, from the video data, a first control flag, wherein the first control flag indicates whether inter-prediction mode is enabled for a video block of the video data 1510 in accordance with a determination that the inter-prediction mode is enabled, determining whether multiple transform units are within the video block 1520 in accordance with a determination that multiple transform units are within the video block:

determining a first transform unit of the multiple transform units to apply a first secondary transform based on a first relative location of the first transform unit within the video block;

applying the first secondary transform to the first transform unit; and processing the video block based at least on the first secondary transform 1530

FIG. 15

SYSTEMS AND METHODS FOR PARTITION DEPENDENT SECONDARY TRANSFORM

CROSS-REFERENCE TO RELATED APPLICATION

This application claims priority to U.S. Provisional Patent Application No. 63/318,262, entitled "Partition Dependent Secondary Transform" filed Mar. 9, 2022, which is hereby incorporated by reference in its entirety.

TECHNICAL FIELD

The disclosed embodiments relate generally to video coding, including but not limited to systems and methods for partition dependent secondary transform.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored.

Multiple video codec standards have been developed. For example, video coding standards include AOMedia Video 1 (AV1), Versatile Video Coding (VVC), Joint Exploration test Model (JEM), High-Efficiency Video Coding (HEVC/H.265), Advanced Video Coding (AVC/H.264), and Moving Picture Expert Group (MPEG) coding. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

HEVC, also known as H.265, is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC), also known as H.266, is a video compression standard intended as a successor to HEVC. ITU-T and ISO/IEC published the VVC/H.266 standard in 2020 (version 1) and 2022 (version 2). AV1 is an open video coding format designed as an alternative to HEVC. On Jan. 8, 2019, a validated version 1.0.0 with Errata 1 of the specification was released.

SUMMARY

The present disclosure describes advanced video coding technologies, more specifically, a partition dependent secondary transform method.

In accordance with some embodiments, a method of video coding is provided. The method includes receiving, from the video stream/data, a first control flag, wherein the first control flag indicates whether an inter-prediction mode is enabled for a video block of the video stream/data; in accordance with a determination that the inter-prediction mode is enabled, determining whether multiple transform units are within the video block; and in accordance with a determination that multiple transform units are within the video block: determining a transform unit of the multiple transform units to apply a secondary transform based on a relative location of the transform unit within the video block, applying the secondary transform to the transform unit, and reconstructing/processing the video block based at least on the secondary transform.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and/or a decoder component.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for coding video. Such methods, devices, and systems may complement or replace conventional methods, devices, and systems for video coding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 4 shows examples of primary transform basis functions in accordance with some embodiments.

FIG. 5A shows a table of exemplary dependencies of availability of various transform kernels based on a transform block size and a prediction mode in accordance with some embodiments.

FIG. 5B shows a table exemplary transform type selections based on an intra prediction mode in accordance with some embodiments.

FIG. 7 shows a table of exemplary mapping from intra nominal mode and primary transform type to IST set in accordance with some embodiments.

FIG. 10 shows an exemplary mapping from boundary type to transform by using the DST-VII in accordance with some embodiments.

FIG. 11 shows an exemplary mapping from boundary type to transform by using the DCT-IV in accordance with some embodiments.

FIG. 12 shows exemplary transforms used for the TUs in FIG. 9 in accordance with some embodiments.

FIG. 14 is an exemplary flow diagram illustrating a method of coding video in accordance with some embodiments.

FIG. 15 is an exemplary flow diagram illustrating a method of coding video in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 1:
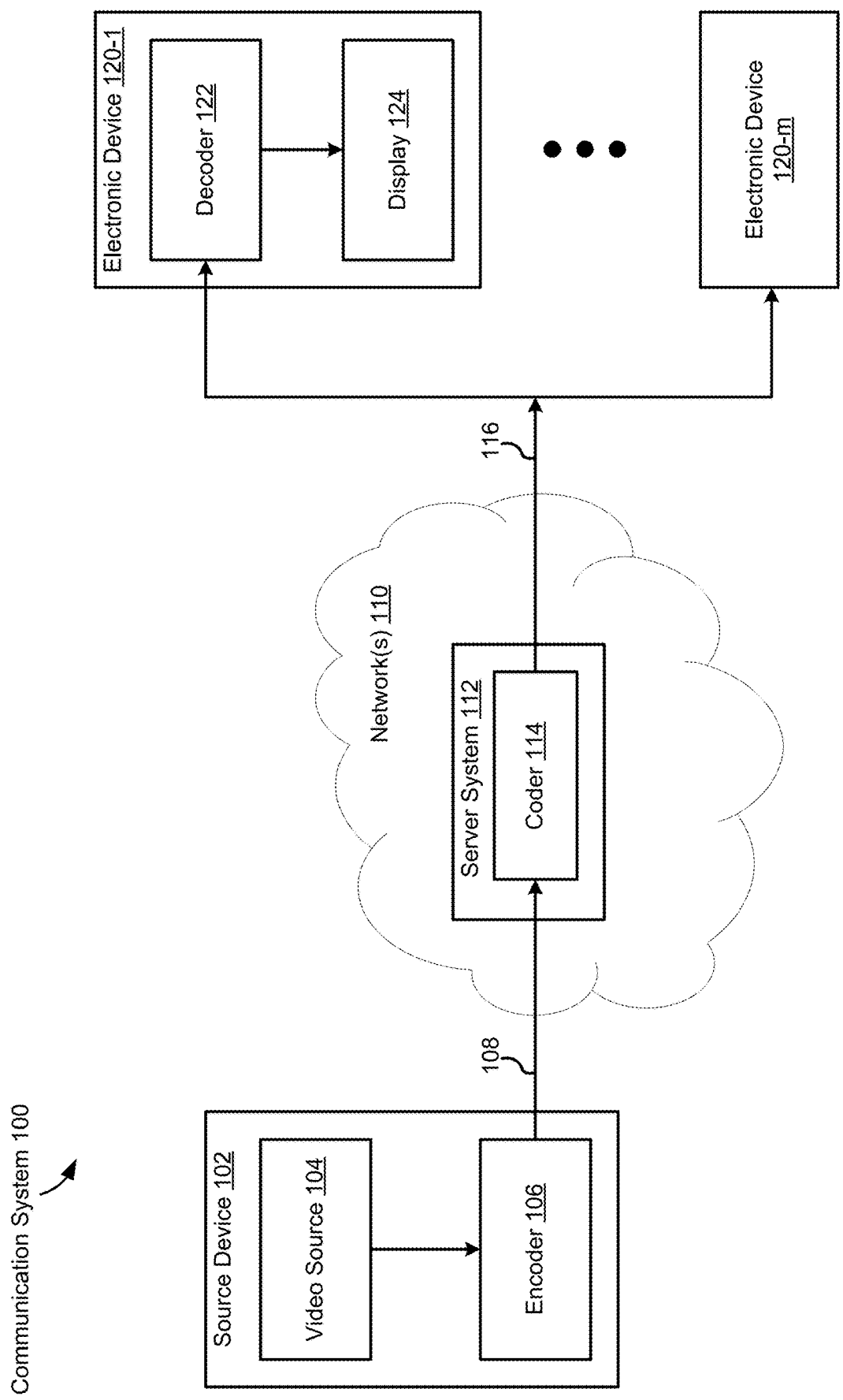
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video data to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108.

In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices

120. Each electronic device 120 may decode the encoded video data 116 to recover and optionally display the video pictures.

In some embodiments, the transmissions discussed above are unidirectional data transmissions. Unidirectional data transmissions are sometimes utilized in in media serving applications and the like. In some embodiments, the transmissions discussed above are bidirectional data transmissions. Bidirectional data transmissions are sometimes utilized in videoconferencing applications and the like. In some embodiments, the encoded video bitstream 108 and/or the encoded video data 116 are encoded and/or decoded in accordance with any of the video coding/compressions standards described herein, such as HEVC, VVC, and/or AV1.

Figure 2A:
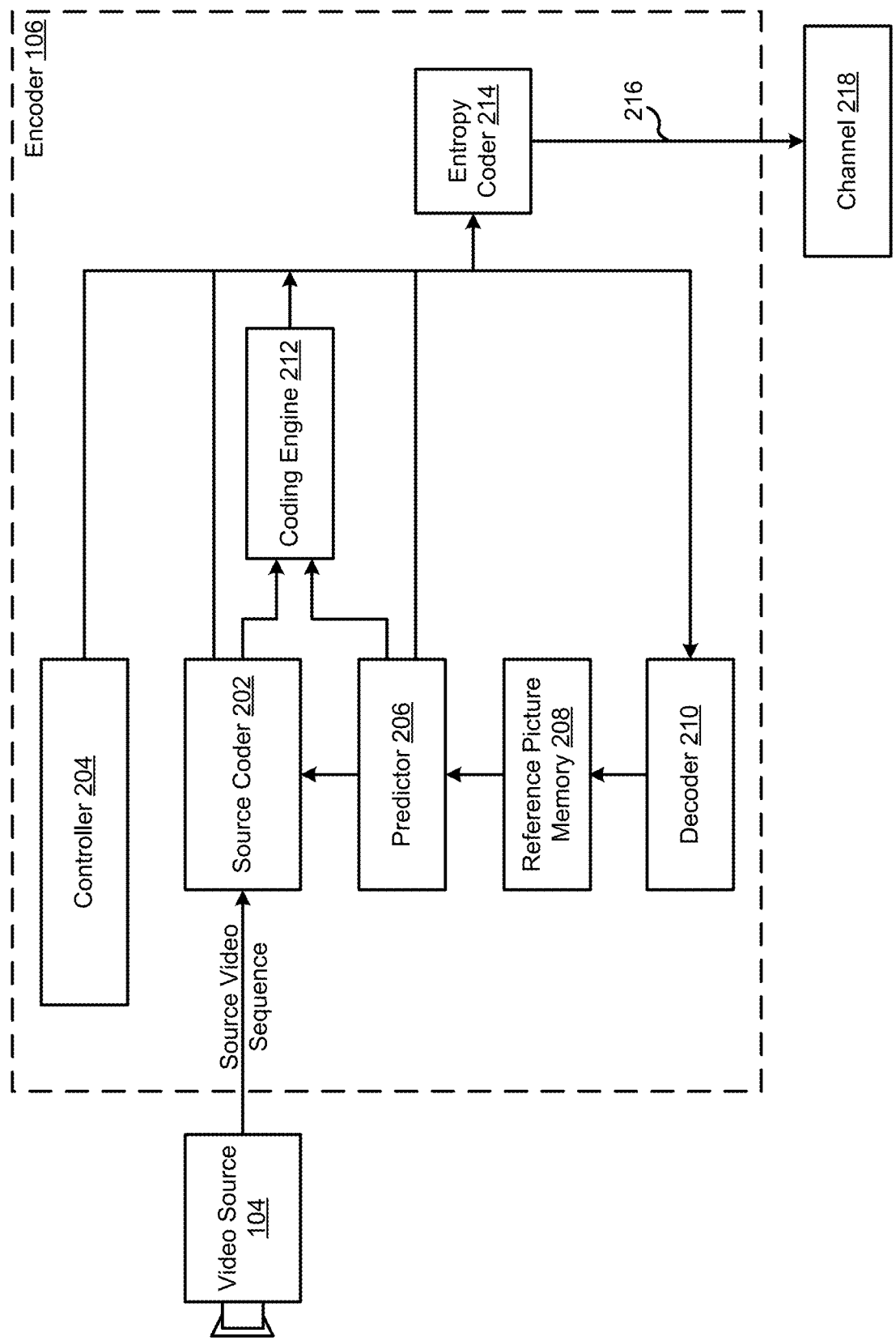
FIG. 2A is a block diagram illustrating example elements of an encoder component in accordance with some embodiments.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture (s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. In some cases, as determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Infra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
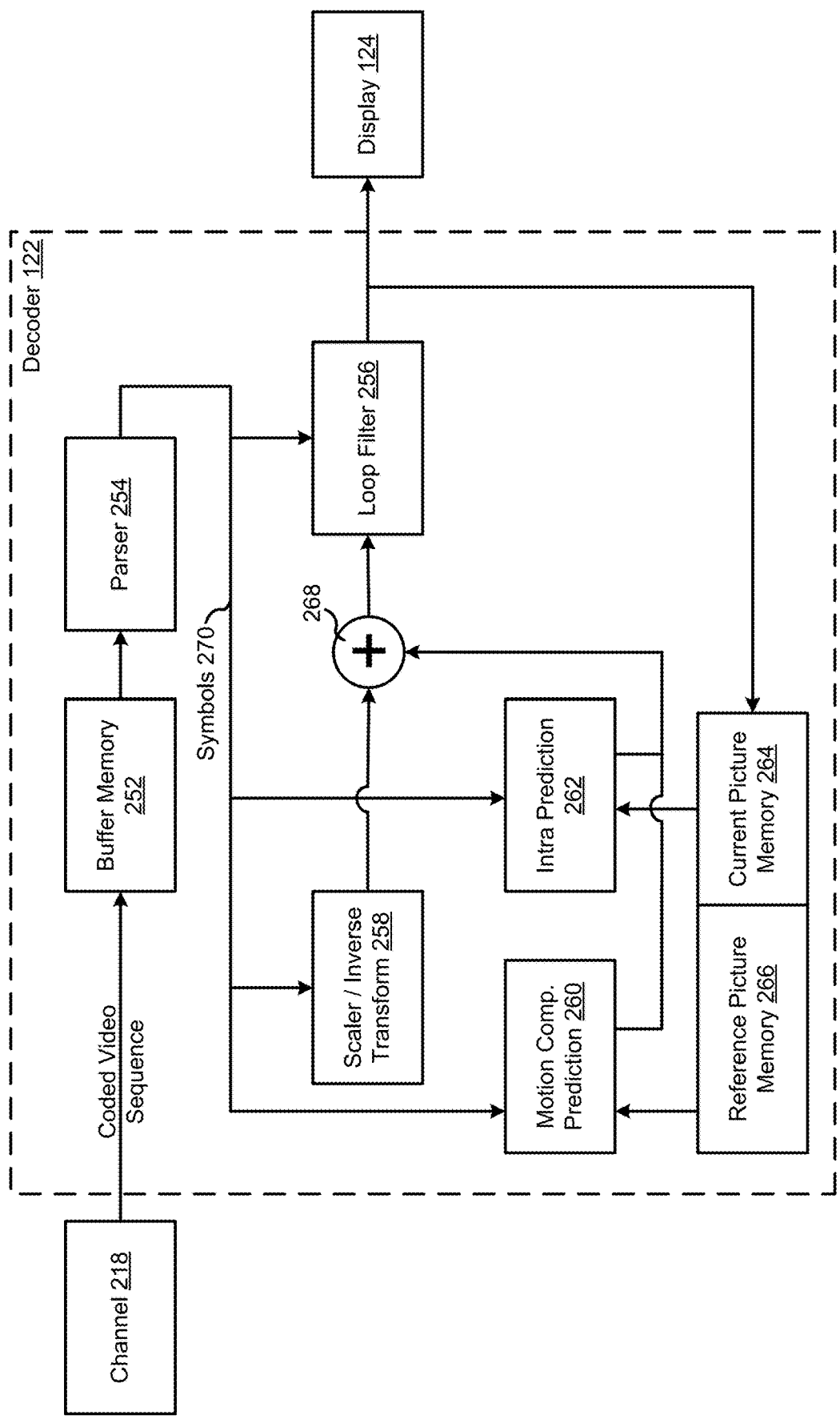
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

Beyond the functional blocks already mentioned, decoder component 122 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is maintained.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values.

The output of the loop filter unit 256 can be a sample stream that can be output to a render device such as the display 124, as well as stored in the reference picture memory 266 for use in future inter-picture prediction.

Certain coded pictures, once fully reconstructed, can be used as reference pictures for future prediction. Once a coded picture is fully reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
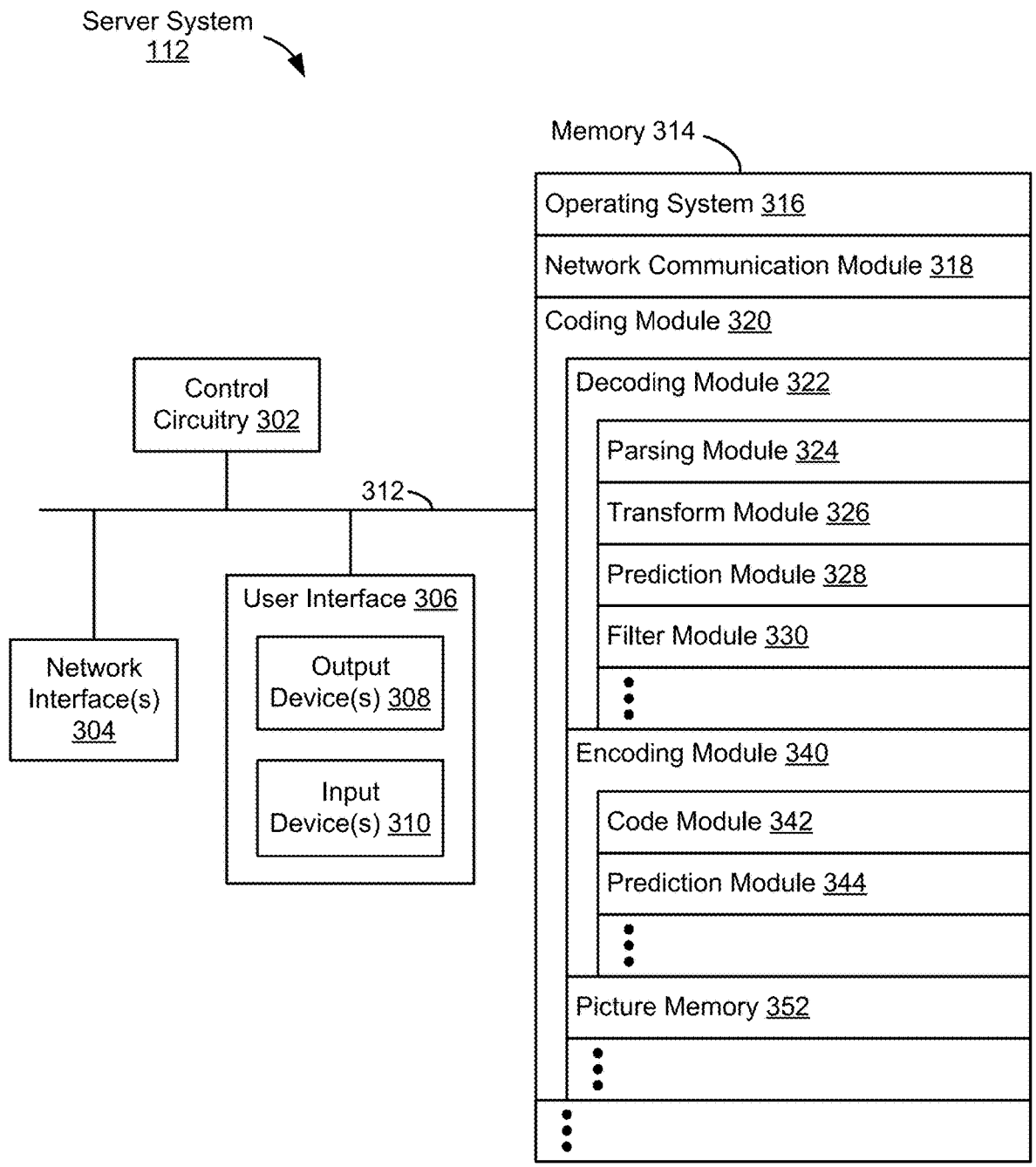
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

In some embodiments, the server system 112 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Embodiments of primary transforms, such as those used in AOMedia Video 1 (AV1), are described below. In order to support extended coding block partitions, such as described in the disclosure, multiple transform sizes (e.g., ranging from 4-point to 64-point for each dimension) and transform shapes (e.g., square, a rectangular shape with a width over a height ratio of 2:1, 1:2, 4:1, and/or 1:4) may be used, such as in AV1.

A 2D transform process may use hybrid transform kernels that may include a different 1D transform for each dimension of a coded residual block. Primary 1D transforms may include (a) a 4-point, an 8-point, a 16-point, a 32-point, a 64-point DCT-2; (b) a 4-point, an 8-point, a 16-point asymmetric DST (ADST) (e.g., a DST-4, a DST-7) and corresponding flipped versions (e.g., a flipped version or a FlipADST of an ADST may apply the ADST in a reverse order); and/or (c) a 4-point, an 8-point, a 16-point, a 32-point identity transform (IDTX). FIG. 4 shows examples of primary transform basis functions in accordance with some embodiments. The primary transform basis functions in the example of FIG. 4 include basis functions for the DCT-2 and the asymmetric DSTs (DST-4 and DST-7) having an N-point input. The primary transform basis functions shown in FIG. 4 may be used in AV1.

The availability of hybrid transform kernels may be dependent on a transform block size and a prediction mode. FIG. 5A shows a table of exemplary dependencies of availability of various transform kernels based on a transform block size and a prediction mode in accordance with some embodiments.

FIG. 5A shows exemplary dependencies of the availability of various transform kernels (e.g., transform types shown in the first column and described in the second column) based on the transform block size (e.g., sizes shown in the third column) and the prediction mode (e.g., the intra prediction and the inter prediction shown in the third column). The exemplary hybrid transform kernels and the availability based on the prediction modes and transform block sizes may be used in AV1. Referring to FIG. 5A, symbols "→" and "↓" denote a horizontal dimension (also referred to as a horizontal direction) and a vertical dimension (also referred to as a vertical direction), respectively. Symbols "✓" and "x" denote the availability of a transform kernel for the corresponding block size and the prediction mode. For example, the symbol "✓" denotes that the transform kernel is available, and the symbol "x" denotes that the transform kernel is unavailable.

In an example, a transform type (510) is denoted by ADST_DCT as shown in the first column of FIG. 5A. The transform type (510) includes an ADST in the vertical direction and a DCT in the horizontal direction as shown in the second column of FIG. 5A. According to the third column of FIG. 5A, the transform type (510) is available for the intra prediction and the inter prediction when the block size is less than or equal to 16×16 (e.g., 16×16 samples, 16×16 luma samples).

In an example, a transform type (520) is denoted by V_ADST as shown in the first column of FIG. 5A. The transform type (520) includes an ADST in the vertical direction and an IDTX (i.e., an identity matrix) in the horizontal direction as shown in the second column of FIG. 5A. Thus, the transform type (520) (e.g., V_ADST) is performed in the vertical direction and is not performed in the horizontal direction. According to the third column of FIG. 5A, the transform type (520) is not available for the intra prediction regardless of the block size. The transform type (520) is available for the inter prediction when the block size is less than 16×16 (e.g., 16×16 samples, 16×16 luma samples).

In an example, FIG. 5A is applicable for a luma component. For a chroma component, a transform type (or a transform kernel) selection may be performed implicitly. FIG. 5B shows a table exemplary transform type selections based on an intra prediction mode in accordance with some embodiments.

In an example, for intra prediction residuals, the transform type may be selected according to an intra prediction mode, as shown in FIG. 5B. In an example, transform type selections shown in FIG. 5B are applicable to a chroma component. For inter prediction residuals, the transform type may be selected according to the transform type selection of a co-located luma block. Therefore, in an example, a transform type for the chroma component is not signaled in a bitstream.

Line graph transforms (LGT) may be used in transforms such as a primary transform, for example, in AOMedia Video 2 (AV2). 8-bit/10-bit transform cores may be used in AV2. In an example, LGTs include various DCTs, discrete sine transforms (DSTs), as described below. LGTs may include 32-point and 64-point 1-dimensional (1D) DSTs.

Graphs are generic mathematical structures including sets of vertices and edges that may be used for modelling affinity relations between objects of interest. Weighted graphs where a set of weights are assigned to edges and optionally to vertices may provide sparse representations for robust modeling of signals/data. LGTs may improve coding efficiency by providing a better adaptation for diverse block statistics. Separable LGTs may be designed and optimized by learning line graphs from data to model underlying row and column-wise statistics of residual signals of a block, and associated generalized graph Laplacian (GGL) matrices may be used to derive the LGTs.

Figure 6:
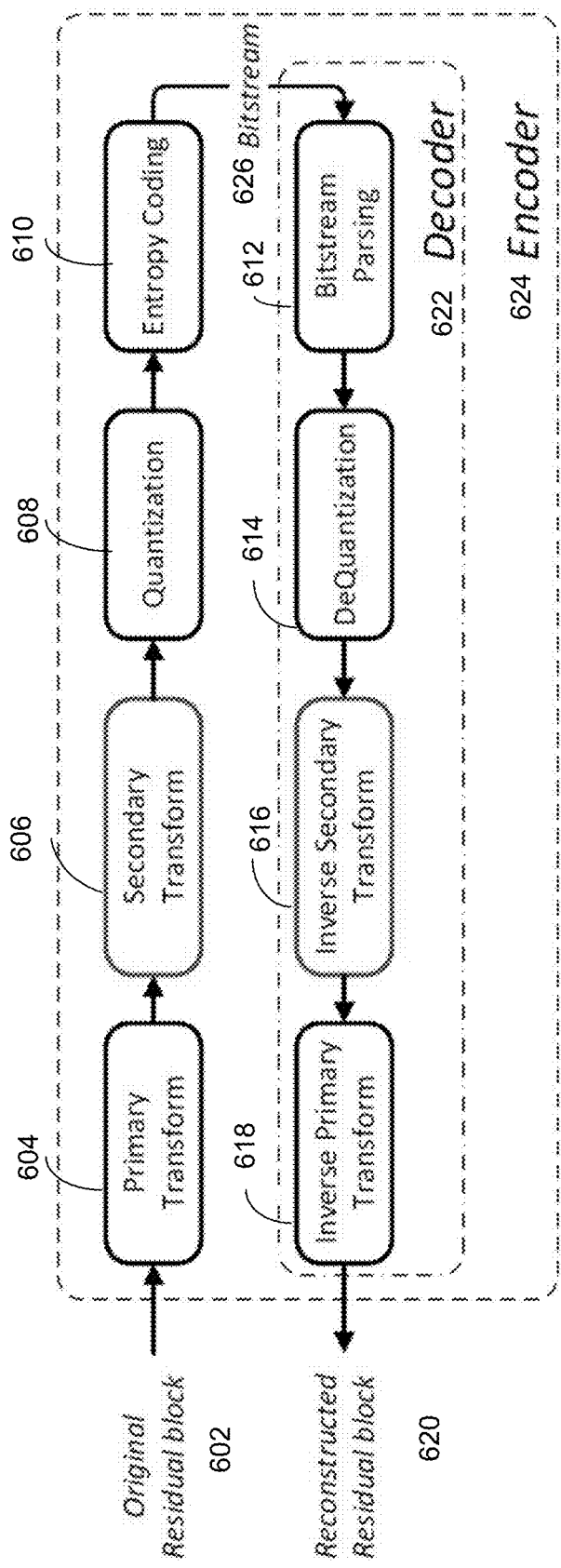
FIG. 6 illustrates an exemplary use of intra secondary transform (IST) in the encoding and decoding process in accordance with some embodiments.

Embodiments of secondary transforms, such as those used in AOMedia Video 2 (AV2), are described below. FIG. 6 illustrates an exemplary use of intra secondary transform (IST) in the encoding and decoding process in accordance with some embodiments. For the original intra prediction residual blocks 602 of the luma color component, a secondary transform 606 method, for example, IST, may be applied to the primary transform 604 coefficient block before applying quantization 608 and entropy coding 610 at the encoder 624 for bitstream 626 transmission. Accordingly, a secondary inverse transform 616 may be applied to a dequantized 614 transform coefficient block after bitstream parsing 612 before applying the inverse primary transform 618 at the decoder 622 to form reconstructed residual blocks 620. IST may not be applied to the chroma color components.

In an example, in IST, a non-separable transform process is applied. To apply a forward non-separable transform to a specific region of the input transform coefficient block that consists of N samples, the N samples are first organized as an N×1 vector ($\vec{x}$) using the coefficient scanning order according to the relative coordinate of each sample in the input N samples. Then an N×N transform kernel (K) is selected, and the non-separable transform is performed using the following arithmetic operation:

$$\vec{y} = K\vec{x}. \quad (1)$$

where $\vec{y}$ is the output N×1 vector that replaces a specific region of the transform coefficient block using the coefficient scanning order.

In an example, to apply an inverse non-separable transform, the dequantized transform coefficient block is first given as input, then a specific region of the dequantized transform coefficient block is identified based on the transform block size. An input vector $\vec{y}$ is formed by reorganizing the transform coefficient using the coefficient scanning order. Given the selected N×N transform kernel and input vector $\vec{y}$, the inverse non-separable transform is performed using the following arithmetic operation:

$$\vec{x} = K^T \cdot \vec{y}, \quad (2)$$

where $(\bullet)^T$ refers to the matrix transpose operation. The output $\vec{x}$ is an N×1 vector that replaces a specific region of the input block following the specific coefficient scanning order.

In an example, the input to the forward IST is a coefficient vector that consists of the low frequency primary transform coefficients in a zig-zag scan. According to the block size, either a 16-point or 64-point non-separable secondary transform may be selected. When the minimum value of the primary transform width and primary transform height is less than 8, the 16-point IST is used, and the low frequency primary transform coefficients refer to the first 16 primary transform coefficients in the zig-zag scan order. When both primary transform width and height are greater than or equal to 8, the 64-point IST is applied, and the low frequency primary transform coefficients refer to the first 64 primary transform coefficients in the zig-zag scan order. The 16-point non-separable transform uses an 8×16 transform kernel, and the 64-point non-separable transform uses a 32×64 transform kernel. Moreover, when IST is applied, the high frequency transform coefficients that are not processed by secondary transform are zeroed out.

FIG. 7 shows a table of exemplary mapping from intra nominal mode and primary transform type to IST set in accordance with some embodiments. In total, 12 secondary transform sets (or IST sets) are defined, each of which contains 3 secondary transform kernels. For each intra coded transform block, the nominal intra prediction mode and the primary transform type are identified first, then the IST set is selected based on FIG. 7. For Paeth prediction mode and recursive intra prediction modes, IST is neither applied nor signaled.

In an example, given the IST set, there are four encoder options: 1) no secondary transform, 2) secondary transform using the first transform kernel in the given IST set, 3) secondary transform kernel using the second transform kernel in the given IST set, and 4) secondary transform kernel using the third transform kernel in the given IST set. The encoder signals the selection using the syntax element ist_idx. At the decoder, the value of syntax element ist_idx is parsed first. Then, given the IST set and value associated with ist_idx, the secondary transform kernel is identified. This syntax element ist_idx is signaled for each lima transform block after the signaling of primary transform type. The signaling of ist_idx is performed if all of the following conditions are true: (1) The current block is an intra coded luma transform block; (2) The primary transform type is DCT in both dimensions or ADST in both dimensions; (3) The intra prediction mode is neither Paeth prediction mode nor recursive intra prediction mode; (4) The transform partitioning depth is 0; (5) End-of-block (EOB) position falls within the low-frequency transform coefficient region where secondary transform is applicable.

In some examples, the entropy coding context for ist_idx is derived based on the transform block size.

Figure 8:
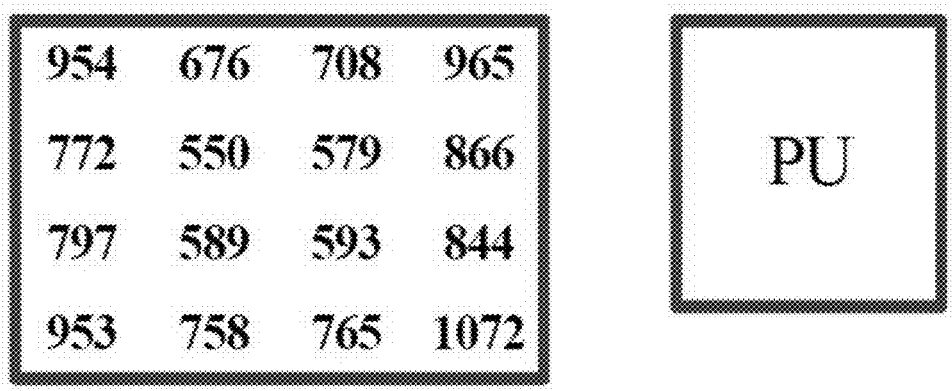
FIG. 8 illustrates exemplary square error distribution within a 4×4 prediction unit (PU) in accordance with some embodiments.

Embodiments of boundary dependent transform are described below. FIG. 8 illustrates exemplary square error distribution within a 4×4 prediction unit (PU) in accordance with some embodiments. When using inter prediction for a PU, generally the prediction errors are larger near the PU boundaries than in the middle of the PU. The numbers in FIG. 8 show an example of the square error distribution over a 4×4 PU.

Figure 9:
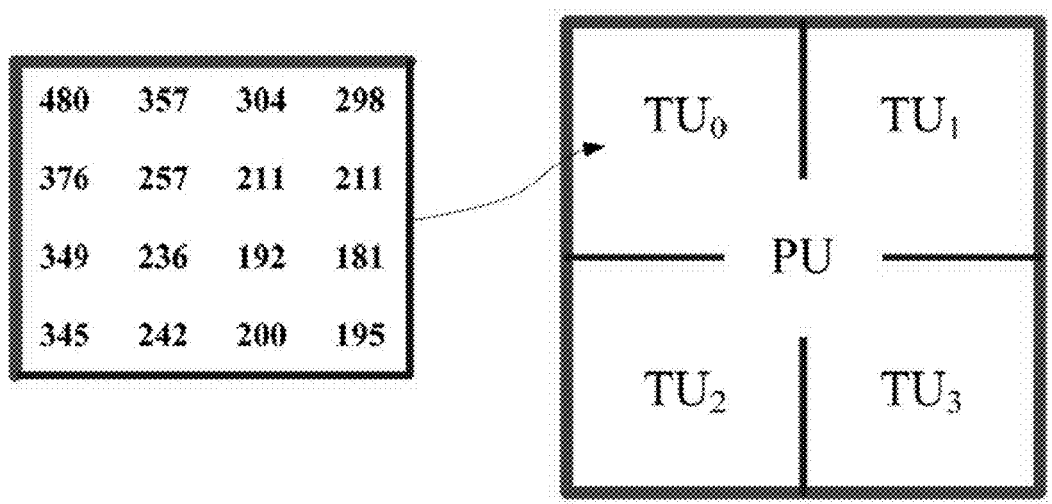
FIG. 9 illustrates an exemplary split PU and the error distribution within the top-left transform unit (TU) in accordance with some embodiments.

FIG. 9 illustrates an exemplary split PU and the error distribution within the top-left transform unit (TU) in accordance with some embodiments. Similarly, when a PU is split into multiple transform units (TUs) as shown in FIG. 9, the prediction errors are larger near the PU boundaries than near the interior TU (non-PU) boundaries. The numbers in FIG. 9 show the square error distribution in $TU_0$ at the top-left corner of the PU. The error decreases from top to bottom and from left to right. The reason for this effect may be due to the different motion vectors (MV) between two neighboring PUs. To handle this uneven error distribution, alternative transforms such as DST-WI and DCT-IV may be used. Equations (3) and (4) show the N-point DST-VII and DCT-IV of signal f[n], respectively.

$$\hat{f}_{DST-VII}[k] = \frac{2}{\sqrt{2N+1}} \sum_{n=0}^{N-1} f[n] \sin \frac{(2k+1)(n+1)\pi}{2N+1}, \quad (3)$$

$$k = 0, 1, \ldots, N-1$$

$$\hat{f}_{DCT-IV}[k] = \frac{2}{\sqrt{N}} \sum_{n=0}^{N-1} f[n] \cos\left[\frac{\pi}{N}\left(k+\frac{1}{2}\right)\left(n+\frac{1}{2}\right)\right], k = 0, 1, \ldots, N-1 \quad (4)$$

In some examples, based on the above observation, DST-VII and/or DCT-IV may be used instead of DCT-II if one and only one of the two TU boundaries is a PU boundary. FIG. 10 shows an exemplary mapping from boundary type to transform by using the DST-VII in accordance with some embodiments. In some examples, FIG. 10 applies to 4-point (pt) transform. FIG. 11 shows an exemplary mapping from boundary type to transform by using the DCT-IV in accordance with some embodiments. In some examples, FIG. 11 applies to 8-pt and/or 16 pt transform. DST-VII and DCT-IV are not used for 32-pt transform for little gain and high complexity. In FIG. 10 and FIG. 11, the items "non-PU" and "PU" mean non-PU boundary and PU boundary, respectively.

FIG. 12 shows exemplary transforms used for the TUs in FIG. 9 in accordance with some embodiments. The F(DST-VII) in FIG. 10 and FIG. 12 may mean flipping the DST matrix from left to right. The cases of using F(DST-VII) may also be implemented as flipping the input data first and then using DST-VII. This is also the case for F(DCT-IV).

According to FIG. 10, the four TUs in FIG. 9 may take transforms as shown in FIG. 12.

In some approaches, for transform units located at different relative positions within a coding block, the residual may show different statistics, so different secondary transforms may be designed to achieve efficient transform coding for these residual blocks.

In some embodiments, the methods disclosed herein may be used separately or combined in any order. Further, each of the methods (or embodiments), encoder, and decoder may be implemented by processing circuitry (e.g., one or more processors or one or more integrated circuits). In one example, one or more processors execute a program that is stored in a non-transitory computer-readable medium. In the following, the term block may be interpreted as a prediction block, a coding block, or a coding unit, i.e., CU. The term block here may also be used to refer to the transform block. In this document, when saying size of a block, it may refer to the block width, or block height, or block aspect ratio, or block area size, or the minimum/maximum between block width and height.

In this disclosure, transform block may be also referred to as transform unit. When saying a transform unit is located at the boundary of a coding block, or saying a transform unit is a boundary TU, it means that the coding block has multiple transform units, and a transform unit has at least one boundary that overlaps with one boundary of the coding block.

Figure 13:
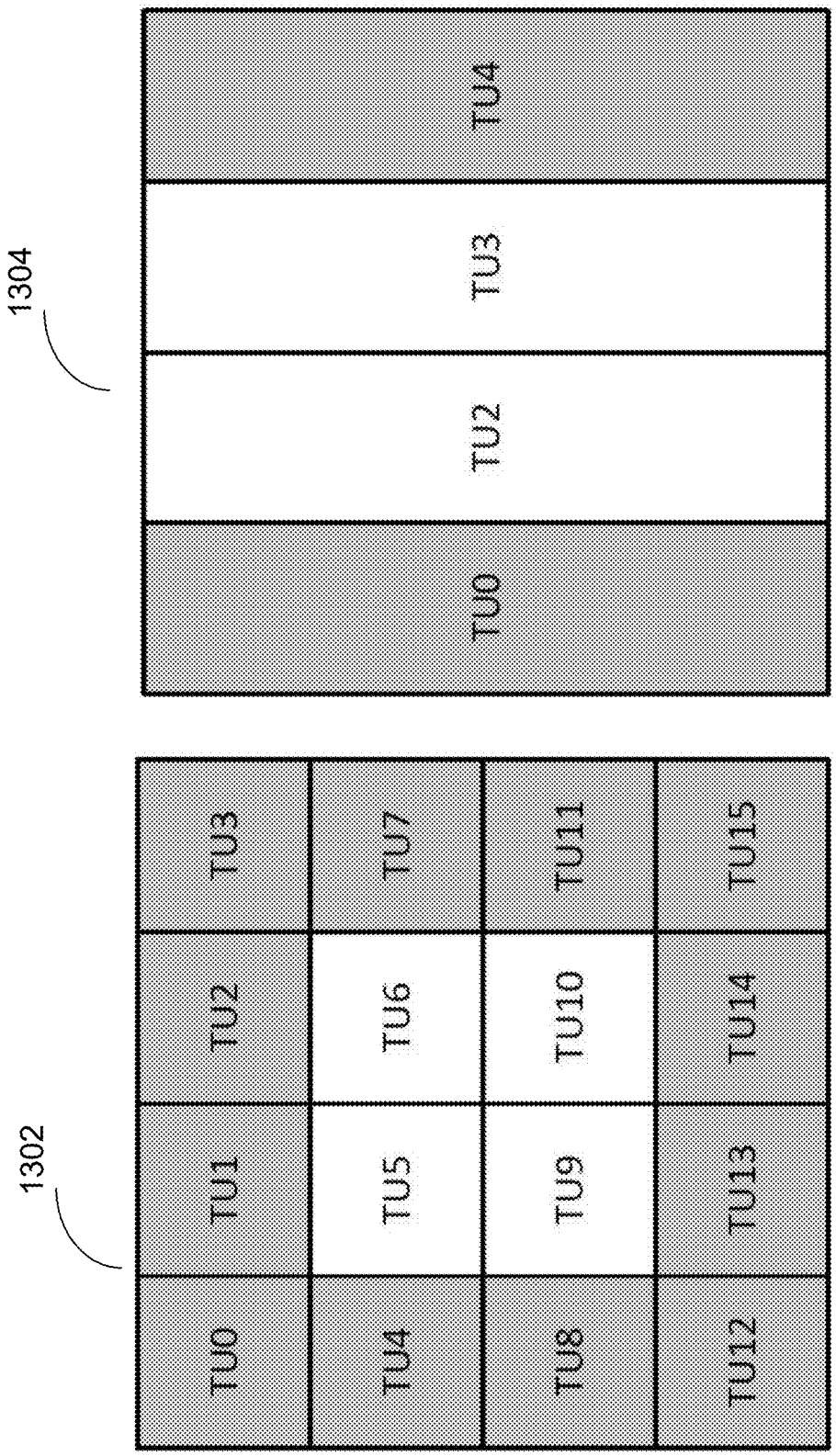
FIG. 13 illustrates examples of TUs inside a coding block in accordance with some embodiments.

FIG. 13 illustrates examples of TUs inside a coding block in accordance with some embodiments.

For example, in the left video block 1302 of FIG. 13, the TUs with grey background are boundary TUs, and TU5/TU6/TU9/TU10 are not boundary TUs.

Alternatively, when saying a transform unit is located at the boundary of a coding block, or saying a transform unit is a boundary TU, it means that the coding block has multiple transform units, and a transform unit has at least one boundary that overlaps with one boundary of the coding block but the opposite side of the overlapping boundary does not overlap with the coding block. For example, in right video block 1304 of FIG. 13, TU0 and TU4 are boundary TUs, both TU0 and TU4 have three boundaries that overlaps with coding block boundary. For TU0, the left boundary overlaps completely with the coding block boundary, meanwhile for TU4, the right boundary overlaps completely with coding block boundary.

In some aspects/embodiments, when a coding block has multiple transform blocks, the secondary transform selection and/or signaling may be different depending on the relative location of transform unit inside a coding block.

FIG. 14 is an exemplary flow diagram illustrating a method 1400 of coding video in accordance with some embodiments. FIG. 15 is an exemplary flow diagram illustrating a method 1500 of coding video in accordance with some embodiments. The method 1400 and/or 1500 may be performed at a computing system (e.g., the server system 112, the source device 102, or the electronic device 120) having control circuitry and memory storing instructions for execution by the control circuitry. In some embodiments, the method 1400 and/or 1500 may be performed by executing instructions stored in the memory (e.g., the memory 314) of the computing system. The method 1400 and/or 1500 may be performed by an encoder (e.g., encoder 106) and/or a decoder (e.g., decoder 122).

Referring to FIG. 14, in one aspect, the video decoder (e.g., decoder 122 in FIG. 2B and/or decoder 622 in FIG. 6) receives, from the video stream (e.g., the bitstream 626 in FIG. 6) a first control flag, and the first control flag indicates whether an inter-prediction mode is enabled for a video block (e.g., the prediction block (PU) of FIG. 9, video blocks 1302, 1304 in FIG. 13) of the video stream (1410).

The video decoder, in accordance with a determination that the inter-prediction mode is enabled, determines whether multiple transform units (e.g., TU0, TU1, TU2 and TU3 in FIG. 9, TU0-TU15 in FIG. 13) are within the video block (1420).

The video decoder, in accordance with a determination that multiple transform units are within the video block: determines a first transform unit of the multiple transform units to apply a first secondary transform (e.g., inverse secondary transform 616 of FIG. 6) based on a first relative location of the first transform unit within the video block; applies the first secondary transform to the first transform unit; and reconstructs the video block based at least on the first secondary transform (1430).

Referring to FIG. 15, in one aspect, the video encoder (e.g., encoder 106 in FIG. 2B and/or encoder 624 in FIG. 6) receives, from the video data (e.g., the original residual block 602 in FIG. 6) a first control flag, wherein the first control flag indicates whether an inter-prediction mode is enabled for a video block (e.g., the prediction block (PU) of FIG. 9, video blocks 1302, 1304 in FIG. 13) of the video data (1510).

The video encoder, in accordance with a determination that the inter-prediction mode is enabled, determines whether multiple transform units (e.g., TU0, TU1, TU2 and TU3 in FIG. 9, TU0-TU15 in FIG. 13) are within the video block (1520).

The video encoder, in accordance with a determination that multiple transform units are within the video block: determines a first transform unit of the multiple transform units to apply a first secondary transform (e.g., secondary transform 606 of FIG. 6) based on a first relative location of the first transform unit within the video block; applies the first secondary transform to the first transform unit; and processes the video block based at least on the first secondary transform (1530).

In one embodiment and/or any combination of the embodiments disclosed herein, the video decoder/encoder, in accordance with a determination that multiple transform units are within the video block, further determines a second transform unit of the multiple transform units to apply a second secondary transform or no secondary transform based on a second relative location of the second transform unit within the video block; applies the second secondary transform or no secondary transform to the second transform unit; and reconstructs/processes the video block further based at least on the second secondary transform. In some examples, the first relative location and the second relative location are different, and the first secondary transform and the second secondary transform are different.

In one embodiment and/or any combination of the embodiments disclosed herein, secondary transform is applied for selected transform units inside an inter coding block.

In one embodiment and/or any combination of the embodiments disclosed herein, the selection of transform units which apply secondary transform depends on the relative location of transform unit inside a coding block.

In one embodiment and/or any combination of the embodiments disclosed herein, for inter coding blocks (including coding blocks coded by combined intra-inter prediction mode), secondary transform may be only applied to boundary TUs. In one embodiment, for inter coding blocks using compound prediction, a different secondary transform set is applied to boundary TUs comparing to the secondary transform set applied for inter coding blocks using single reference prediction. For example, the first transform unit is located at a boundary location of the video block.

In one embodiment and/or any combination of the embodiments disclosed herein, the secondary transform set depends on which coding block boundary the TU is located within the coding block. For TUs located at different boundaries (top, left, right, bottom, top-left, top-right, bottom-left, bottom-right), different secondary transform sets may be applied. For example, the method 1400/1500 further includes reconstructing/processing the video block by applying a third secondary transform to a third transform unit of the multiple transform units within the video block, wherein the first transform unit is located in a first boundary location and third transform unit is located in a secondary boundary location of the video block, and the third secondary transform is different from the first secondary transform. In one embodiment, the secondary transform is only applied for TUs located at the corners (top-left, top-right, bottom-left, bottom-right) of a coding block. For example, the first transform unit is located at a corner of the video block.

In one embodiment and/or any combination of the embodiments disclosed herein, when a coding block is inter coded, secondary transform is still applied for all TUs, but the context used for entropy coding the secondary transform index/flag depends on the relative TU location within a coding block. For example, the method 1400/1500 further includes determining a secondary transform context for entropy coding, wherein the secondary transform context is determined based on a relative location of a transform unit of the multiple transform units within the video block. In one example, the context used for entropy coding the secondary transform index/flag depends on whether a TU is a boundary TU or not. For example, the method 1400/1500 further includes determining a first secondary transform context for entropy coding for the first transform unit, and determining a second secondary transform context for entropy coding for the second transform unit, wherein the first transform unit is a boundary unit and the second transform unit is not a boundary unit, and the first secondary transform context is different from the second secondary transform context for entropy coding.

In one embodiment and/or any combination of the embodiments disclosed herein, when a coding block is inter coded, the secondary transform applied on TUs located at different relative locations within a coding block share the same elements/coefficients in transform basis. However, the elements/coefficients are arranged in different order. For example, the first secondary transform and the second secondary transform share the same one or more coefficients in transform basis. In one embodiment, the elements are arranged in a basis vector following an order that is dependent on the relative TU location within a coding block. For example, the one or more coefficients in transform basis are arranged in a basis vector following an order that is dependent on a relative location of a transform unit of the multiple transform units within the video block.

In one embodiment and/or any combination of the embodiments disclosed herein, when a coding block is inter coded, given the relative location of TU within a coding block, an intra prediction mode is identified, and then according to that intra prediction mode, a secondary transform set is identified and used for performing secondary transform of this TU. For example, determining the first transform unit of the multiple transform units to apply the first secondary transform based on the first relative location of the first transform unit within the video block includes identifying the first secondary transform according to a secondary transform used for an intra prediction mode of the first transform unit according to the first relative location of the first transform unit. In one embodiment, the relative location of TU within a coding block is mapped to one of the following intra prediction modes: DC, SMOOTH, SMOOTH-H, SMOOTH-V, Horizontal, Vertical, Diagonal (45 degree), Diagonal (135 degree), Diagonal (225 degree). For example, the first transform unit is mapped to a first intra prediction mode and the second transform unit is mapped to a second intra prediction mode, wherein the first intra prediction mode is different from the second intra prediction mode.

In one embodiment and/or any combination of the embodiments disclosed herein, for inter coding blocks, the signaling of secondary transform for a transform unit also depends on the secondary transform index/flag signaled for neighboring TUs. For example, a first signaling flag of the first secondary transform is different from a second signaling flag of the second secondary transform. For example, the first signaling flag of the first secondary transform is dependent on a flag of a secondary transform signaled for one or more neighboring transform units of the first transform unit.

Although FIG. 14 and FIG. 15 illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein.

In yet another aspect, some embodiments include a non-transitory computer-readable storage medium storing one or more sets of instructions for execution by control circuitry of a computing system, the one or more sets of instructions including instructions for performing any of the methods described herein.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of processing a video stream performed at a computing system having memory and control circuitry, the method comprising:
   receiving, from the video stream, a first control flag, wherein the first control flag indicates whether an inter-prediction mode is enabled for a video block of the video stream;
   in accordance with a determination that the inter-prediction mode is enabled, determining whether multiple transform units are within the video block; and
   in accordance with a determination that multiple transform units are within the video block:
      determining a first transform unit of the multiple transform units to apply a first secondary transform based on a first relative location of the first transform unit within the video block;
      applying the first secondary transform to the first transform unit; and
      reconstructing the video block based at least on the first secondary transform.

2. The method of claim 1, further comprising:
   determining a second transform unit of the multiple transform units to apply a second secondary transform or no secondary transform based on a second relative location of the second transform unit within the video block;
   applying the second secondary transform or no secondary transform to the second transform unit; and
   reconstructing the video block further based at least on the second secondary transform;
   wherein the first relative location and the second relative location are different, and the first secondary transform and the second secondary transform are different.

3. The method of claim 1, wherein the first transform unit is located at a boundary location of the video block.

4. The method of claim 3, further comprising:
   reconstructing the video block by applying a third secondary transform to a third transform unit of the multiple transform units within the video block, wherein the first transform unit is located in a first boundary location and third transform unit is located in a secondary boundary location of the video block, and the third secondary transform is different from the first secondary transform.

5. The method of claim 1, wherein the first transform unit is located at a corner of the video block.

6. The method of claim 1, further comprising:
   determining a secondary transform context for entropy coding, wherein the secondary transform context is determined based on the first relative location of the first transform unit of the multiple transform units within the video block.

7. The method of claim 2, further comprising:
   determining a first secondary transform context for entropy coding for the first transform unit, and determining a second secondary transform context for entropy coding for the second transform unit, wherein the first transform unit is a boundary unit and the second transform unit is not a boundary unit, and the first secondary transform context is different from the second secondary transform context for entropy coding.

8. The method of claim 2, wherein the first secondary transform and the second secondary transform share the same one or more coefficients in transform basis.

9. The method of claim 8, wherein the one or more coefficients in transform basis are arranged in a basis vector following an order that is dependent on a relative location of a transform unit of the multiple transform units within the video block.

10. The method of claim 2, wherein determining the first transform unit of the multiple transform units to apply the first secondary transform based on the first relative location of the first transform unit within the video block comprises:
    identifying the first secondary transform according to a secondary transform used for an intra prediction mode of the first transform unit according to the first relative location of the first transform unit.

11. The method of claim 10, wherein the first transform unit is mapped to a first intra prediction mode and the second transform unit is mapped to a second intra prediction mode, wherein the first intra prediction mode is different from the second intra prediction mode.

12. The method of claim 2, wherein a first signaling flag of the first secondary transform is different from a second signaling flag of the second secondary transform.

13. The method of claim 12, wherein the first signaling flag of the first secondary transform is dependent on a flag of a secondary transform signaled for one or more neighboring transform units of the first transform unit.

14. An electronic device for processing one or more video blocks of a video stream, the electronic device comprising a memory for storing computer instructions and a processor in communication with the memory, wherein the processor, when executing the computer instructions, is configured to cause the electronic device to:
    receive, from the video stream, a first control flag, wherein the first control flag indicates whether an inter-prediction mode is enabled for a video block of the video stream;
    in accordance with a determination that the inter-prediction mode is enabled, determine whether multiple transform units are within the video block; and in accordance with a determination that multiple transform units are within the video block:
　determine a first transform unit of the multiple transform units to apply a first secondary transform based on a first relative location of the first transform unit within the video block;
　apply the first secondary transform to the first transform unit; and
　reconstruct the video block based at least on the first secondary transform.

15. The electronic device of claim 14, wherein the processor is further configured to execute the computer instructions to:
　determine a second transform unit of the multiple transform units to apply a second secondary transform or no secondary transform based on a second relative location of the second transform unit within the video block;
　apply the second secondary transform or no secondary transform to the second transform unit; and
　reconstruct the video block further based at least on the second secondary transform;
　wherein the first relative location and the second relative location are different, and the first secondary transform and the second secondary transform are different.

16. The electronic device of claim 14, wherein the first transform unit is located at a boundary location of the video block.

17. The electronic device of claim 16, wherein the processor is further configured to execute the computer instructions to:
　reconstruct the video block by applying a third secondary transform to a third transform unit of the multiple transform units within the video block, wherein the first transform unit is located in a first boundary location and third transform unit is located in a secondary boundary location of the video block, and the third secondary transform is different from the first secondary transform.

18. The electronic device of claim 15, wherein the processor is further configured to execute the computer instructions to:
　determine a first secondary transform context for entropy coding for the first transform unit, and determine a second secondary transform context for entropy coding for the second transform unit, wherein the first transform unit is a boundary unit and the second transform unit is not a boundary unit, and the first secondary transform context is different from the second secondary transform context for entropy coding.

19. The electronic device of claim 15, wherein the first secondary transform and the second secondary transform share the same one or more coefficients in transform basis.

20. A non-transitory computer readable medium for storing computer instructions, wherein the computer instructions, when executed by a processor of an electronic device, cause the electronic device to:
　receive, from a video stream, a first control flag, wherein the first control flag indicates whether an inter-prediction mode is enabled for a video block of the video stream;
　in accordance with a determination that the inter-prediction mode is enabled, determine whether multiple transform units are within the video block; and
　in accordance with a determination that multiple transform units are within the video block:
　　determine a first transform unit of the multiple transform units to apply a first secondary transform based on a first relative location of the first transform unit within the video block;
　　apply the first secondary transform to the first transform unit; and
　　reconstruct the video block based at least on the first secondary transform.

\* \* \* \* \*